(12) United States Patent
Jones et al.

(10) Patent No.: US 10,557,568 B2
(45) Date of Patent: Feb. 11, 2020

(54) MULTI-SIDED CABLE CLAMPS

(71) Applicant: Hubbell Incorporated, Shelton, CT (US)

(72) Inventors: Jeffrey Sean Jones, Birmingham, AL (US); Rabih M. Al Ghossein, Hoover, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/130,659

(22) Filed: Sep. 13, 2018

(65) Prior Publication Data

US 2019/0086003 A1 Mar. 21, 2019

Related U.S. Application Data

(60) Provisional application No. 62/559,009, filed on Sep. 15, 2017.

(51) Int. Cl.
| | | |
|---|---|---|
| H02G 7/00 | (2006.01) | |
| F16L 3/015 | (2006.01) | |
| H01R 13/58 | (2006.01) | |
| G02B 6/38 | (2006.01) | |

(52) U.S. Cl.
CPC ............ *F16L 3/015* (2013.01); *G02B 6/3807* (2013.01); *H01R 13/5804* (2013.01)

(58) Field of Classification Search
CPC ..... F16L 3/015; F16L 3/00; F16L 3/01; F16L 3/02; G02B 6/3807; H01R 13/5804; H01R 13/58; H02G 3/32; H02G 3/30; H02G 7/00; H02G 7/02; H02G 7/04; H02G 7/05; H02G 7/08; H02G 7/12; H02G 7/20

USPC ........ 174/68.1, 68.3, 72 A, 40 CC, 40 R, 42, 174/44, 45 R, 146, 41, 147; 248/68.1, 49, 248/74.1, 74.2, 61
See application file for complete search history.

(56) References Cited

U.S. PATENT DOCUMENTS

| | | |
|---|---|---|
| 1,489,835 A | 4/1924 | Kietz |
| 1,603,035 A | 10/1926 | Evans |
| 2,107,061 A | 2/1937 | Pittman et al. |
| 2,120,447 A | 6/1938 | Tipsord |
| 2,151,524 A | 3/1939 | Pittman et al. |
| 2,206,653 A | 7/1940 | Yonkers |
| 2,397,390 A | 3/1946 | Wadsworth |
| 2,530,299 A | 11/1950 | Hendley |

(Continued)

FOREIGN PATENT DOCUMENTS

| | | |
|---|---|---|
| JP | 08308071 | 11/1996 |
| JP | 10042438 | 2/1998 |
| JP | 2001136643 | 5/2001 |

OTHER PUBLICATIONS

Burndy Fastap Installation Instructions 2014.

(Continued)

*Primary Examiner* — Angel R Estrada
(74) *Attorney, Agent, or Firm* — Wissing Miller LLP

(57) ABSTRACT

A multi-sided cable clamp for clamping drop cables to main span cables. The cable clamp has a central body and a plurality of cable holding assemblies. The plurality of cable holding assemblies are formed into or secured to a side wall of the central body. A coupling member having an eye is operatively coupled to or integrally formed into a bottom surface of the central body so that the eye can be coupled to an extendable reach tool.

21 Claims, 8 Drawing Sheets

(56) References Cited

U.S. PATENT DOCUMENTS

| | | | |
|---|---|---|---|
| 2,574,796 A | 11/1951 | Moore | |
| 2,651,766 A | 9/1953 | Runde | |
| 2,811,703 A | 10/1957 | Becker | |
| 2,867,787 A | 1/1959 | Nilsson | |
| 2,958,067 A | 10/1960 | Hardy | |
| 3,036,286 A | 5/1962 | Gorc et al. | |
| 3,075,166 A | 1/1963 | Peek | |
| 3,132,914 A | 5/1964 | Wengen | |
| 3,142,535 A | 7/1964 | Roosman | |
| 3,177,459 A | 4/1965 | Toedtman | |
| 3,431,538 A | 3/1969 | Hubbard | |
| 3,614,700 A | 10/1971 | Beard et al. | |
| 3,830,427 A | 8/1974 | Polidori | |
| 3,923,363 A | 12/1975 | Kraft | |
| 3,970,286 A * | 7/1976 | Ross | E21F 17/06 174/146 |
| 4,082,917 A * | 4/1978 | Hendrix | H01B 17/20 174/146 |
| 4,183,686 A | 1/1980 | De France | |
| 4,223,176 A * | 9/1980 | Hawkins | H02G 7/125 174/146 |
| 4,293,176 A | 10/1981 | Linklof | |
| 4,600,264 A | 7/1986 | Counsel | |
| 4,707,051 A | 11/1987 | Hall | |
| 4,846,725 A | 7/1989 | Williams et al. | |
| 5,004,437 A | 4/1991 | Walter et al. | |
| 5,021,014 A | 6/1991 | Walter et al. | |
| D329,244 S | 9/1992 | Saito et al. | |
| 5,369,849 A | 12/1994 | De France | |
| 5,440,665 A | 8/1995 | Ray | |
| 5,539,961 A | 7/1996 | DeFrance | |
| 5,547,404 A | 8/1996 | Nellis, Jr. et al. | |
| 5,692,930 A | 12/1997 | Garver et al. | |
| 5,801,336 A * | 9/1998 | Blanding | H02G 7/20 174/146 |
| 6,303,856 B1 * | 10/2001 | Bello | H02G 7/12 174/146 |
| 6,371,419 B1 | 4/2002 | Ohnuki | |
| 6,390,861 B1 | 5/2002 | DeFrance | |
| 6,421,494 B1 * | 7/2002 | Battey | H02G 15/007 174/40 CC |
| 6,448,503 B1 * | 9/2002 | McKinnon | H02G 7/12 174/146 |
| 6,595,472 B1 | 7/2003 | Pisczak | |
| 6,732,981 B2 | 5/2004 | Franks | |
| 7,029,316 B2 | 4/2006 | Jackson, III | |
| 7,160,142 B2 | 1/2007 | Hughes et al. | |
| 7,323,636 B1 * | 1/2008 | Borges | H02G 7/12 174/41 |
| 7,666,024 B2 | 2/2010 | De France | |
| 7,692,100 B2 * | 4/2010 | Boisclair | H02G 7/12 174/146 |
| 7,973,672 B2 * | 7/2011 | Holsomback | G01R 31/085 174/40 R |
| 8,512,070 B2 | 8/2013 | De France | |
| 8,672,716 B2 | 3/2014 | DeFrance | |
| 9,577,351 B2 | 2/2017 | Martin | |
| 10,095,001 B2 | 10/2018 | Sakmar | |
| 2002/0142674 A1 | 10/2002 | Chadbourne et al. | |
| 2013/0303035 A1 | 11/2013 | Neal et al. | |
| 2016/0294074 A1 | 10/2016 | De France et al. | |
| 2018/0031794 A1 | 2/2018 | Sakmar | |
| 2018/0031795 A1 | 2/2018 | Ai Ghossein | |

OTHER PUBLICATIONS

Hubbell Brochure "Overhead Primary Taps Hot Line Tap Clamps Aluminum", Dec. 2014 (32 pages).
Fargo Brochure "GH-700A", Jan. 1995 (2 pages).
Burndy Fastap Introduction Sheet 2014.

* cited by examiner

MULTI-SIDED CABLE CLAMPS

CROSS REFERENCE TO RELATED APPLICATIONS

The present disclosure is based on and claims benefit from U.S. Provisional Patent Application Ser. No. 62/559,009 filed on Sep. 15, 2017 entitled "Multi-Sided Cable Clamps" the entire contents of which are incorporated herein by reference.

BACKGROUND

Field

The present disclosure relates generally to clamps for communication cabling and more particularly to cable clamps for clamping drop cables to main span cables.

Description of the Related Art

Aerial cabling, such as fiber optic cabling, is typically strung from utility pole to utility pole, or from a utility pole to a building. The cabling between utility poles is often referred to as a main span. To withstand cable sag and environmental conditions, two types of fiber optic cables are available to string from pole-to-pole or from pole-to-building: lashed fiber optic cables or self-supporting fiber optic cables. Lashed fiber optic cable uses a galvanized steel support wire to which the fiber optic cable is affixed or lashed. Self-supporting fiber optic cable typically includes a strength member in the form of a messenger section supporting the fiber optic cable, and a carrier section that includes optical fibers, or optical fibers and electrical conductors. An example of self-supporting fiber optic cable is RPX cable manufactured by Corning Cable Systems.

With aerial fiber optic cabling, connections between fiber cables are typically made in close proximity to the utility pole or building. However, there are instances where drop connections are needed. Drops are cable connections between a main span and a drop cable at a point along the main span. Drops for fiber optic cabling are used when, for example, smaller quantities of fibers are needed to feed a terminal. The smaller quantities of fibers are in a drop cable and run to a terminal located at a utility pole or building.

Drops are achieved on lashed aerial cable using a bolted cable clamp with a hook. The cable clamp is bolted to the galvanized steel support wire that the fiber optic cable is lashed to, and then a dead-end is attached to the hook to hold the drop. In instances where a bucket truck can be used, a technician would bolt the cable clamp to the galvanized steel support wire while standing in the bucket. In instances where a bucket truck cannot be used, a technician would lean a ladder against the galvanized steel support wire in order to bolt the cable clamp to the galvanized steel support wire.

However, such bolted cable clamps are not suitable for self-supporting fiber optic cable as they do not use a galvanized steel support wire. In addition, certain self-supporting fiber optic cables, such as RPX cable, do not allow for the support of a ladder leaning against it. As a result, in instances where a bucket truck cannot be used, the clamp has to be installed from the ground using extendable reach tools, e.g., a hot stick. Typical bolted type cable clamps are not suitable for such ground-based installations. Accordingly, a cable clamp capable of clamping a drop cable to a main span cable is needed. The present disclosure provides a cable clamp that can be used with self-supporting or lashed fiber optic cables for drops where the cable clamp is to be installed from the ground.

SUMMARY

The present disclosure provides embodiments of multi-sided cable clamps for clamping drop cables to main span cables. In one exemplary embodiment, the multi-sided cable clamp has a central body and a plurality of cable holding assemblies secured to or integrally formed into the central body and extending from a side edge of the central body. In an exemplary embodiment, the central body has two cable holding assemblies secured to or integrally formed into the central body and extending from a side edge of the central body. In another exemplary embodiment, the central body has three cable holding assemblies secured to or integrally formed into the central body and extending from a side edge of the central body. In another exemplary embodiment, the central body has more than three cable holding assemblies secured to or integrally formed into the central body and extending from a side edge of the central body.

In another exemplary embodiment, the multi-sided cable clamp has a central body and a pair of cable holding assemblies. The central body has at least two side walls and a coupling member extending from an upper or lower surface of the central body. The pair of cable holding assemblies includes a first cable holding assembly that extends from a first of the at least two side walls, and a second cable holding assembly that extends from a second of the at least two side walls. Each cable holding assembly includes a guide member and a clip. The guide member has a first guide portion attached to one of the side walls, a second guide portion extending from one end of the first guide portion and a third guide portion extending from another end of the first guide portion. The clip has a base extending from the first guide portion and a clip arm extending from the base and forming a gap between the first guide portion and the clip arm.

In another exemplary embodiment, the multi-sided cable clamp has a central body and three cable holding assemblies. The central body has a first side wall, a second side wall, a third side wall and a coupling member extending from an upper or lower surface of the central body. The three cable holding assemblies extend from the central body, where a first cable holding assembly extends from the first side wall, a second cable holding assembly extends from the second side wall, a third cable holding assembly extends from the third side wall. Each cable holding assembly includes a guide member and a clip. The guide member has a first guide portion attached to one of the three side walls, a second guide portion extending from one end of the first guide portion and a third guide portion extending from another end of the first guide portion. The clip has a base extending from the first guide portion and a clip arm extending from the base and forming a gap between the first guide portion and the clip arm.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Exemplary embodiments of the multi-sided cable clamp of the present disclosure are shown. For ease of description, the multi-sided cable clamp described herein may also be referenced as the "clamp." The clamp according to the present disclosure is configured to be installed from the ground with an extendable reach tool, such as a hot stick. A first cable holding assembly secures a drop cable to a central body of the clamp, and a second cable holding assembly secures a main span cable to the central body of the clamp. For ease of description, the "main span cable" may also be referred to herein as the "main cable."

Figure 1:
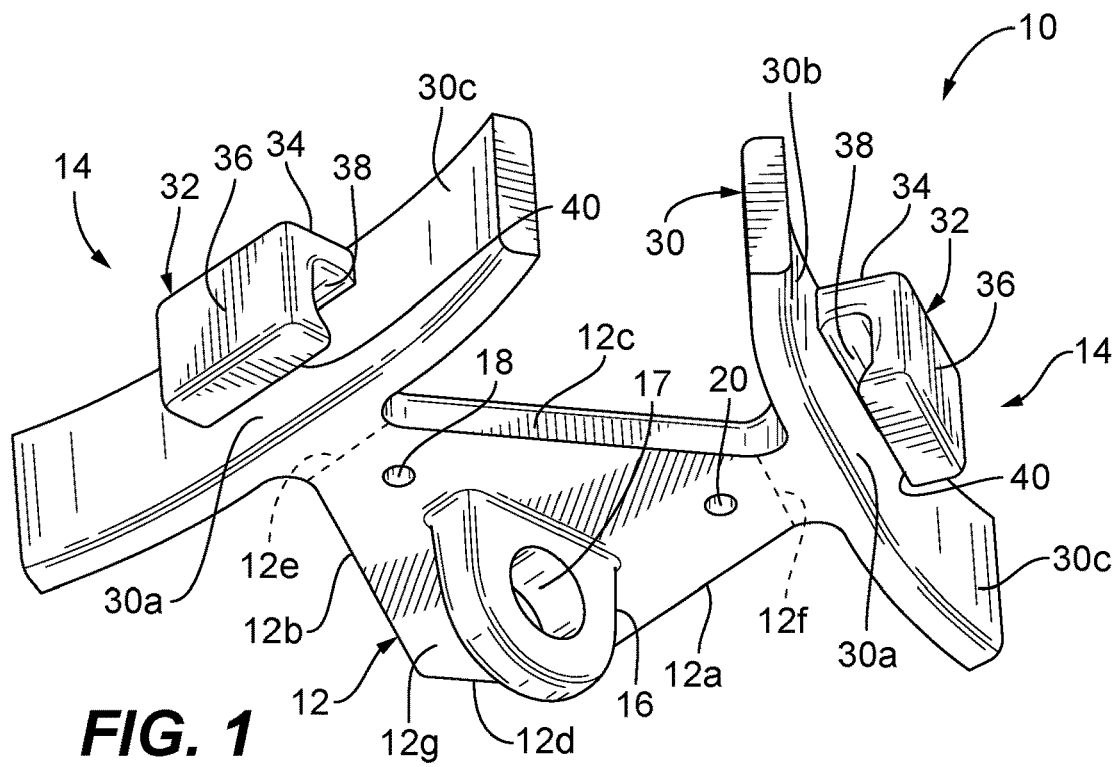
FIG. 1 is a bottom perspective view of an exemplary embodiment of a multi-sided cable clamp according to the present disclosure, illustrating a central body, a first cable holding assembly and a second cable holding assembly.
Figure 2:
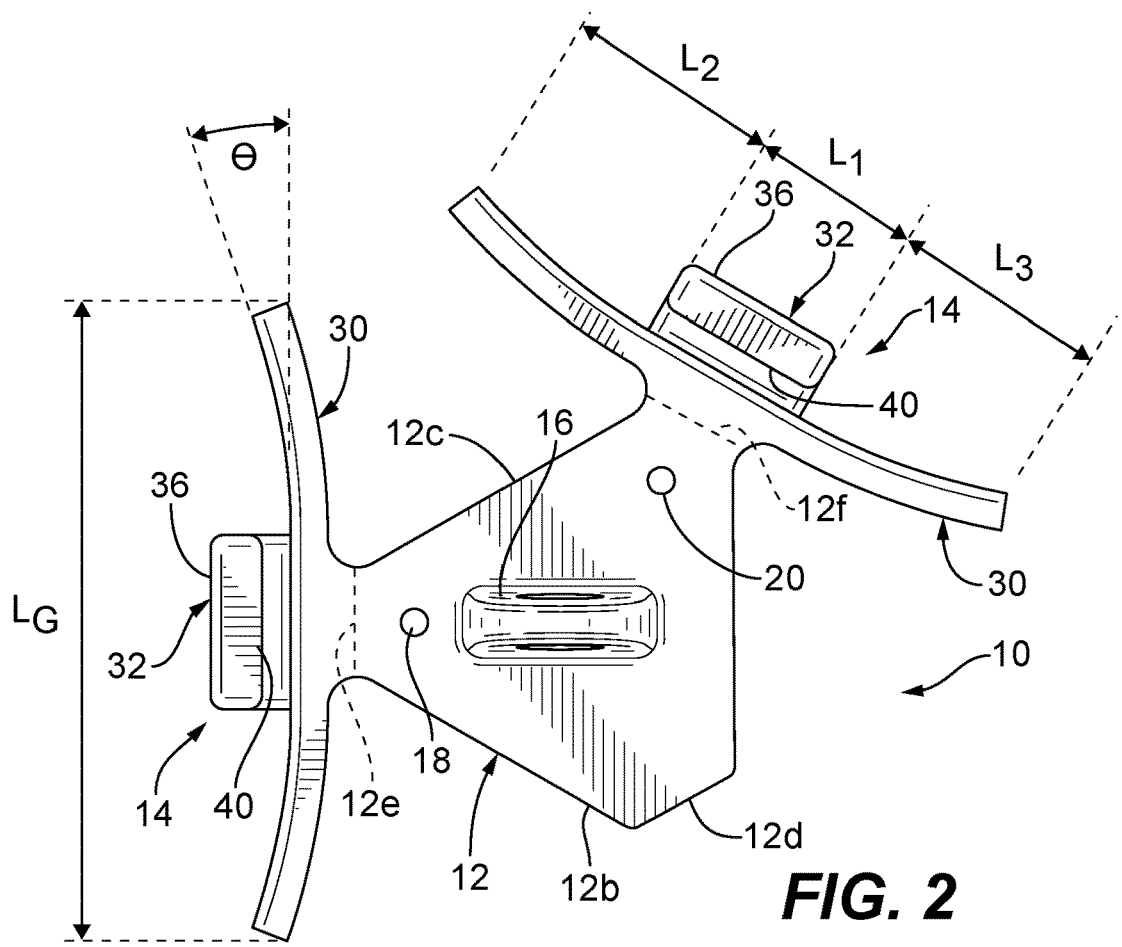
FIG. 2 is a bottom plan view of the multi-sided cable clamp of FIG. 1.
Figure 3:
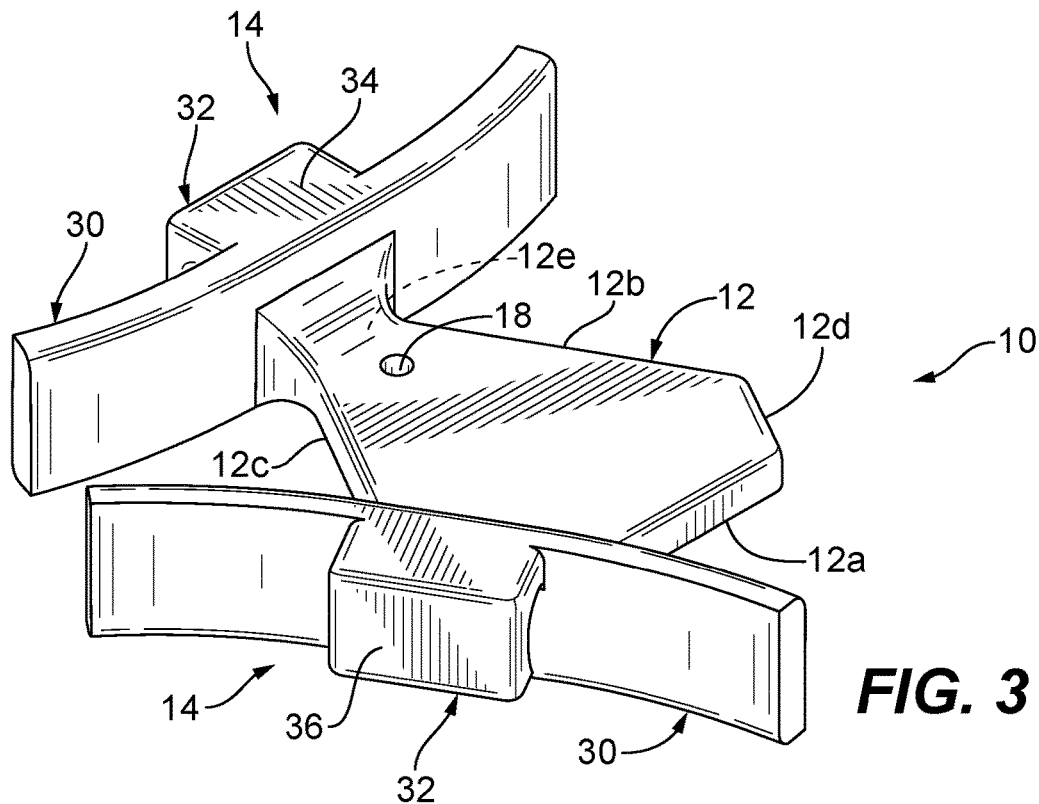
FIG. 3 is a top perspective view of the multi-sided cable clamp of FIG. 1.
Figure 4:
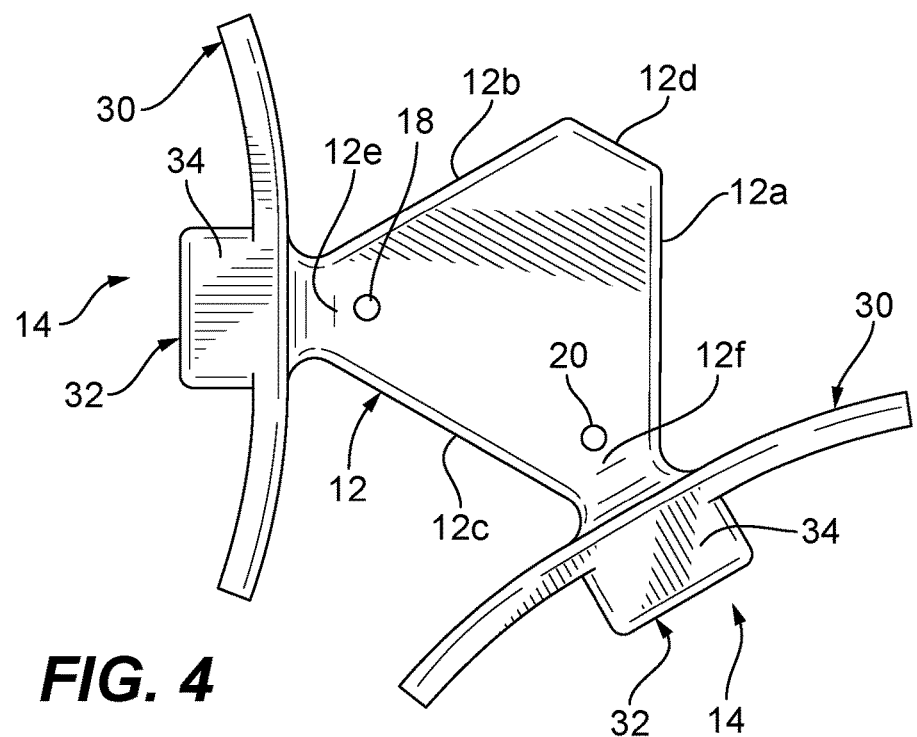
FIG. 4 is a top plan view of the multi-sided cable clamp of FIG. 1.

Referring now to the figures, in particular FIGS. 1-4, an exemplary embodiment of the clamp according to the present disclosure is shown. The clamp 10 includes a central body 12 and a plurality of cable holding assemblies 14, which in this embodiment is two cable holding assemblies. The central body 12 may be formed in a number of different shapes and as a unitary structure or as separate components secured together with fasteners, such as welds, mechanical fasteners or adhesive fasteners. In the exemplary embodiment shown, the central body 12 is a truncated triangular type shape with a first side wall 12a, a second side wall 12b, a third side wall 12c, a first truncated wall 12d, a second truncated wall 12e and a third truncated wall 12f. The central body 12 may be a solid structure, a hollow structure, a partially hollow structure or a hollow structure with one or more interior braces extending between the side walls. The central body 12 includes a coupling member 16 extending from a bottom surface 12g that is used to couple the clamp 10 to an extendable reach tool, such as for example a hot stick. In the exemplary embodiment shown, the coupling member 16 is an eye-bracket having an eye 17 that the extendable reach tool can attach to. The coupling member 16 is secured to or integrally formed into the central body 12. The central body 12 also includes one or more apertures 18 and 20 used to wrap a retaining wire 50, seen in FIGS. 5 and 6, around a cable 200 or 250 attached to the clamp 10 as described below. Preferably, the aperture 18 or 20 is positioned in close proximity to one of the truncated walls 12d, 12e or 12f of the central body 12, as shown in FIGS. 1,2 and 4.

Figure 5:
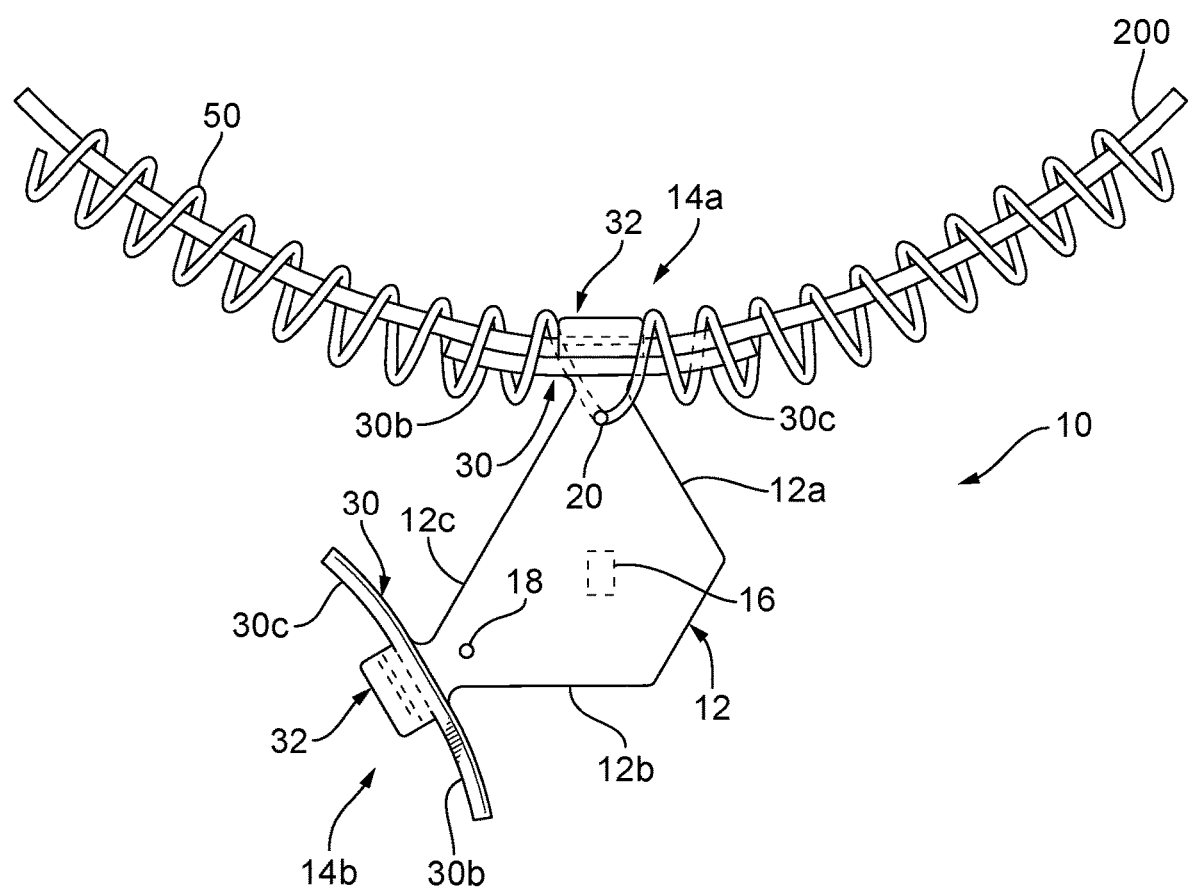
FIG. 5 is a bottom plan view of the multi-sided cable clamp similar to FIG. 2, illustrating a cable held within a cable holding assembly and a retaining wire passing through the central body and wrapped around each end of the cable holding assembly and the cable.
Figure 6:
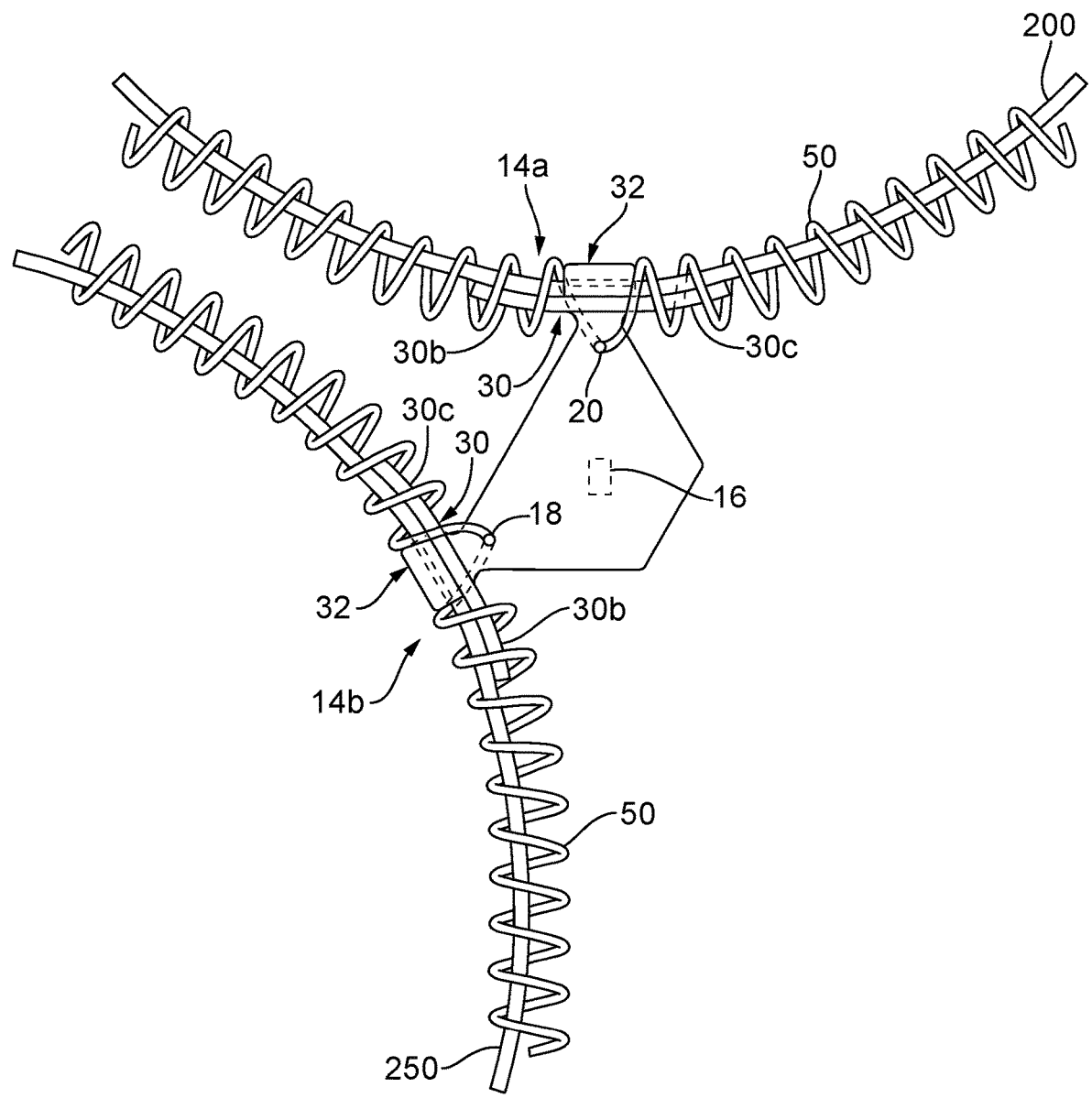
FIG. 6 is a bottom plan view of the multi-sided cable clamp similar to FIG. 2, illustrating a drop cable within a first cable holding assembly and a first retaining wire passing through the central body and wrapped around each end of the first cable holding assembly and the drop cable, and a main cable within a second cable holding assembly and a second retaining wire passing through the central body and wrapped around each end of the second cable holding assembly and the main cable.

The central body 12 and cable holding assemblies 14 may be made of a metallic material, such as aluminum, cast aluminum, galvanized steel or stainless steel, or a combination of metallic materials. In another exemplary embodiment, the central body 12 and cable holding assemblies 14 may be made of a non-metallic material, such as a rigid plastic or composite materials e.g., carbon fiber. In another exemplary embodiment, the central body 12 and cable holding assemblies 14 may be made of a combination of a metallic material and/or a non-metallic material. The retaining wire 50, seen in FIGS. 5 and 6, is made of a metallic or other material that is sufficient to permit the retaining wire 50 to be wrapped around a cable 200 attached to the clamp 10 and to releasably attach the cable 200 to the clamp 10 without damaging the cable 200. A non-limiting example of suitable retaining wire is No. 4 aluminum wire.

Turning to the cable holding assemblies. In this exemplary embodiment, each cable holding assembly 14 is integrally formed into or secured to the central body 12. In the exemplary embodiment of FIGS. 1-4, each cable holding assembly 14 is integrally formed at a truncated wall 12d, 12e or 12f, namely a first cable holding assembly 14 is integrally formed at truncated wall 12e, and a second cable holding assembly 14 is integrally formed at truncated wall 12f.

Each cable holding assembly 14 includes a guide member 30 and a clip 32. The guide member 30 has a first guide portion 30a associated with a center portion of the guide member, a second guide portion 30b associated with one end portion of the guide member, and a third guide portion 30c associated with another end portion of the guide member. Referring to FIG. 2, the dimensions of the guide member 30 are sufficient to support a drop cable 200, as seen in FIG. 6 or a main cable 250. As a non-limiting example, the overall length $L_G$ of the guide member 30 may range from between about 4 inches and about 10 inches and is preferably about 7 inches. The overall length of the guide member 30 may be subdivided by the length "$L_1$" of the first guide portion 30a and the lengths $L_2$ and $L_3$ of the second and third guide portions 30b and 30c, respectively. As a non-limiting example, the length $L_1$ of the first guide portion 30a may be in the range from about 1.0 inch to about 3.0 inches and is preferably about 2.0 inches. The length of the second and third guide portions 30b and 30c of the guide member 30 may be the same or they may differ. For example, the second guide portion 30b has a length $L_2$ that may be in the range from about 1.5 inches to about 3.5 inches and is preferably about 2.5 inches, and the third guide portion 30c has a length $L_3$ that may be in the range from about 1.5 inches to about 3.5 inches and is preferably about 2.5 inches.

Non-limiting examples of the dimensions of the first, second and third guide portions 30a, 30b and 30c of the guide member 30 will be described. If the length $L_G$ of the guide member 30 is about 7 inches and the length $L_1$ of the first guide portion 30a is about 2 inches, the length of the second and third guide portions 30b and 30c may both be about 2.5 inches. If the length $L_G$ of the guide member 30 is about 7 inches and the length $L_1$ of the first guide portion 30a is about 3 inches, the length $L_2$ of the second guide portion 30b may be about 2.5 inches and the length $L_3$ of the third guide portion 30c may be about 1.5 inches.

Each guide member 30 may be a straight structure, a flared structure, a curved structure or an irregular shaped structure. In the exemplary embodiment shown in FIGS. 1-4, each guide member 30 is a flared structure where the first guide portion 30a is substantially straight and the second and third guide portions 30b and 30c are flared such that a radius of curvature of the flare (represented by the angle "θ" in FIG. 2) of the second and third guide portions 30b and 30c is in the range from about 3.5 inches and about 20 inches, and is preferably about 13 inches. As an example, the angle "θ" may be about 6.6 degrees. The flared guide portions 30b and 30c flare the drop cable 200 away from the main cable 250 to decrease the bend strain on the main cable 250. More specifically, the flared drop cable 200 applies a load on the main cable 250 that is substantially perpendicular to the preferred bend axis of the main cable 250 thus decreasing the bend strain on the main cable 250.

The clip 32 has a base 34 extending from the first guide portion 30a of the guide member 30 and clip arm 36. The base 134, seen in FIG. 7 may be integrally formed into the first guide portion 30a or secured to the first guide portion 30a. The clip arm 36 has one end integrally formed into the base 34 and extends from the base 34 to form an L-shaped structure that forms a gap 38, seen in FIG. 1, to hold a cable between the first guide portion 30a and the clip arm 36. A free end of the clip arm 36 has a lip 40 that extends into the gap 38 to reduce the gap 38 opening at the free end of the clip arm 36 so that a cable inserted into the gap 38 can be at least temporarily held in the gap 38.

Turning now to FIGS. 5 and 6, the operation of connecting the clamp 10 to a drop cable 200 and a main cable 250 will now be described. Initially, a drop cable 200 is positioned within the clip 32 of a first cable holding assembly 14a so that the flat part of the cable 200 is in a vertical orientation. An end of a retaining wire 50 is then inserted into the aperture 20 in the central body 12 and a length of the retaining wire 50 is pulled through the aperture 20 and wrapped around the second guide portion 30b of the guide member 30 of the cable holding assembly 14a and the cable 200. Similarly, the remaining length of the retaining wire 50 is wrapped around the third guide portion 30c of the guide member 30 of the cable holding assembly 14a and the cable 200. With the drop cable 200 secured to the clamp 10, an extendable reach tool, such as a hot stick, is then attached to the coupling member 16 as is known, and the extendable reach tool is elevated toward and above a main cable 250 extending, for example between two telephone poles, and then lowered until the main cable 250 is positioned within the clip 32 of a second cable holding assembly 14b. An end of a retaining wire 50 is then inserted into the aperture 18 in the central body 12 and a length of the retaining wire 50 is pulled through the aperture 18 and wrapped around the second guide portion 30b of the guide member 30 of the cable holding assembly 14b and the cable 250. Similarly, the remaining length of the retaining wire 50 is wrapped around the third guide portion 30c of the guide member 30 of the cable holding assembly 14b and the main cable 250. It is noted that an example of a drop cable 200 and a main cable 250 is an RPX self-supporting cable.

Figure 7:
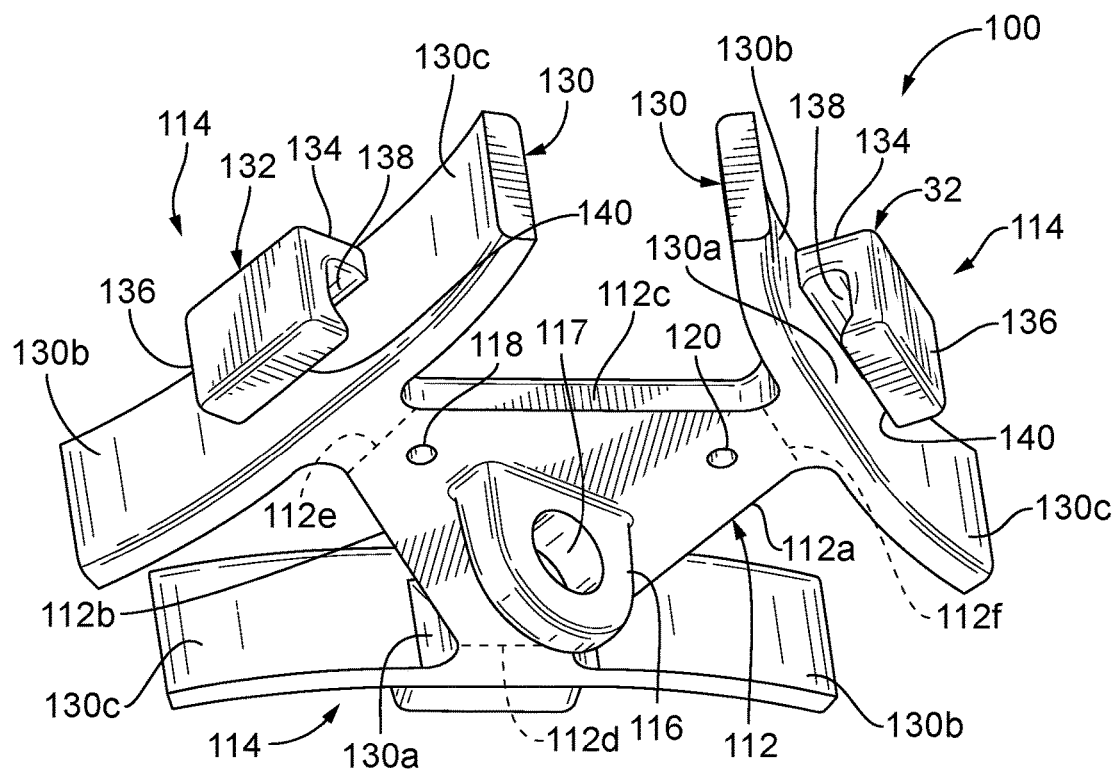
FIG. 7 is a bottom perspective view of another exemplary embodiment of a multi-sided cable clamp according to the present disclosure, illustrating a central body, a first cable holding assembly, a second cable holding assembly and a third cable holding assembly.
Figure 8:
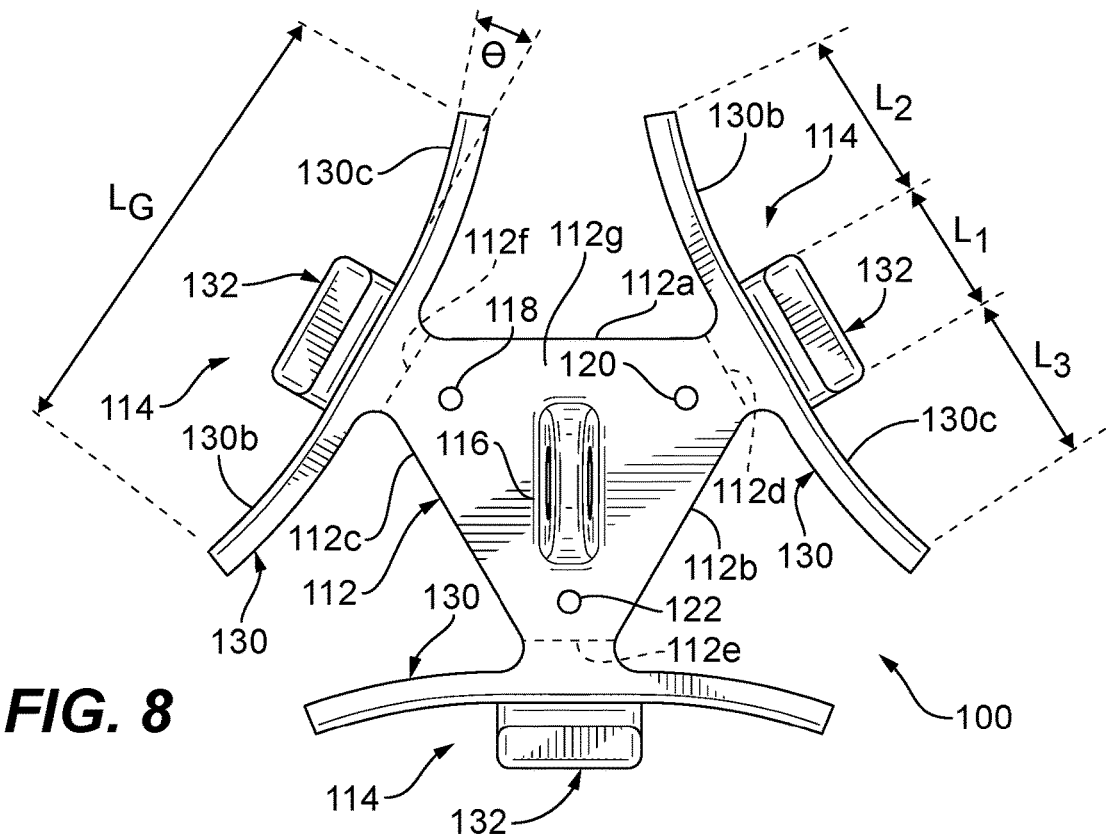
FIG. 8 is a bottom plan view of the multi-sided cable clamp of FIG. 7.
Figure 9:
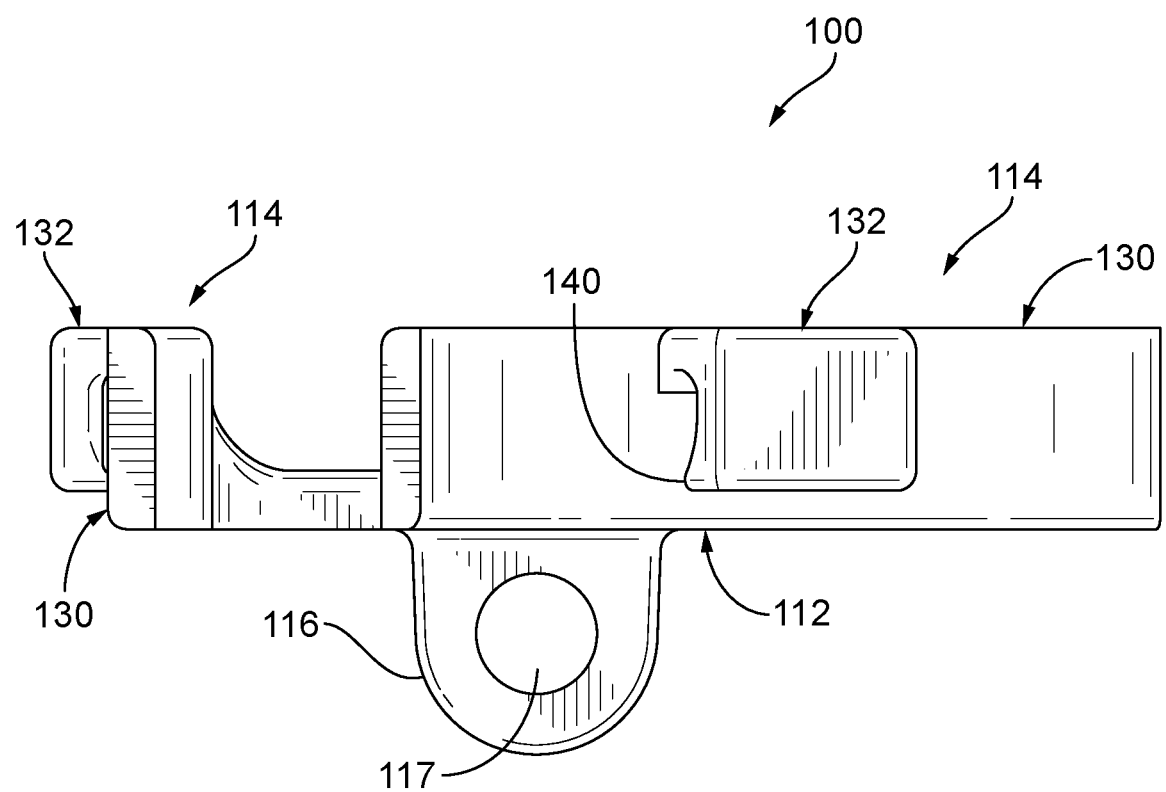
FIG. 9 is a side elevation view of the multi-sided cable clamp of FIG. 7.

Referring now to FIGS. 7-9, another exemplary embodiment of the clamp according to the present disclosure is shown. The clamp 100 includes a central body 112 and a plurality of cable holding assemblies 114, which in this exemplary embodiment is three cable holding assemblies 114. The central body 112 may be formed in a number of different shapes and as a unitary structure or as separate components secured together with fasteners, such as welds, mechanical fasteners or adhesive fasteners. In the exemplary embodiment shown, the central body 112 is a truncated triangular type shape with a first side wall 112a, a second side wall 112b, a third side wall 112c, a first truncated wall 112d, a second truncated wall 112e and a third truncated wall 112f. The central body 112 may be a solid structure, a hollow structure, a partially hollow structure or a hollow structure with one or more interior braces extending between the side walls. The central body 112 includes a coupling member 116 extending from a bottom surface 112g that is used to couple the clamp 100 to an extendable reach tool, such as for example a hot stick. In the exemplary embodiment shown, the coupling member 116 is an eye-bracket having an eye 117 that the extendable reach tool can attach to. The coupling member 116 is secured to or integrally formed into the central body 112. The central body 112 also includes one or more apertures 118, 120 and 122 used to wrap a retaining wire 150, seen in FIGS. 10 and 11, around a first drop cable 200, a second drop cable 202 or a main cable 250 attached to the clamp 100 as described below. Preferably, the aperture 118, 120 or 122 is positioned in close proximity to one of the truncated walls 112d, 112e or 112f of the central body 112, as shown in FIG. 8.

The central body 112 and cable holding assemblies 114 may be made of a metallic material, such as aluminum, cast aluminum, galvanized steel or stainless steel, or a combination of metallic materials. In another exemplary embodiment, the central body 112 and cable holding assemblies 114 may be made of a non-metallic material, such as a rigid plastic or composite materials e.g., carbon fiber. In another exemplary embodiment, the central body 112 and cable holding assemblies 114 may be made of a combination of a metallic material and/or a non-metallic material. The retaining wire 150 is made of a metallic or other material that is sufficient to permit the retaining wire 150 to be wrapped around a cable 200, 202, or 250 attached to the clamp 100 and to releasably attach the cable to the clamp without damaging the cable. A non-limiting example of suitable retaining wire is No. 4 aluminum wire.

Turning to the cable holding assemblies 114. In this exemplary embodiment, each cable holding assembly 114 is integrally formed into or secured to the central body 112. In the exemplary embodiment of FIGS. 7-9, each cable holding assembly 114 is integrally formed at a truncated wall 112d, 112e or 112f, namely a first cable holding assembly 114 is integrally formed at truncated wall 112d, a second cable holding assembly 114 is integrally formed at truncated wall 112e, and a third cable holding assembly 114 is integrally formed at truncated wall 112f.

Each cable holding assembly 114 includes a guide member 130 and a clip 132. The guide member 130 has a first guide portion 130a associated with a center portion of the guide member, a second guide portion 130b associated with one end portion of the guide member, and a third guide portion 130c associated with another end portion of the guide member. Referring to FIG. 8, the dimensions of the guide member 130 are sufficient to support a drop cable 200 or 202 or a main cable 250. As a non-limiting example, the overall length $L_G$ of the guide member 130 may range from between about 4 inches and about 10 inches and is preferably about 7 inches. The overall length of the guide member 130 may be subdivided by the length "$L_1$" of the first guide portion 130a and the lengths $L_2$ and $L_3$ of the second and third guide portions 130b and 130c, respectively. As a non-limiting example, the length $L_1$ of the first guide portion 130a may be in the range from about 1.0 inch to about 3.0 inches and is preferably about 2.0 inches. The length of the second and third guide portions 130b and 130c of the guide member 130 may be the same or they may differ. For example, the second guide portion 130b has a length $L_2$ that may be in the range from about 1.5 inches to about 3.5 inches and is preferably about 2.5 inches, and the third guide portion 130c has a length $L_3$ that may be in the range from about 1.5 inches to about 3.5 inches and is preferably about 2.5 inches.

Non-limiting examples of the dimensions of the first, second and third guide portions 130a, 130b and 130c of the guide member 130 will be described. If the length $L_G$ of the guide member 130 is about 7 inches and the length $L_1$ of the first guide portion 130a is about 2 inches, the length of the second and third guide portions 130b and 130c may both be about 2.5 inches. If the length $L_G$ of the guide member 130 is about 7 inches and the length $L_1$ of the first guide portion 130a is about 3 inches, the length $L_2$ of the second guide portion 130b may be about 2.5 inches and the length $L_3$ of the third guide portion 130c may be about 1.5 inches.

Each guide member 130 may be a straight structure, a flared structure, a curved structure or an irregular shaped structure. In the exemplary embodiment shown in FIGS. 7-9, each guide member 130 is a flared structure where the first guide portion 130a is substantially straight and the second and third guide portions 130b and 130c are flared such that a radius of curvature of the flare (represented by the angle "θ" in FIG. 8) of the second and third guide portions 130b and 130c is in the range from about 3.5 inches and about 20 inches, and is preferably about 13 inches. As an example, the angle "θ" may be about 6.6 degrees. The flared guide portions 130b and 130c flare the drop cable 200 or 202 away from the main cable to decrease the bend strain on the main cable 250. More specifically, the flared drop cable 200 or 202 applies a load on the main cable 250 that is substantially perpendicular to the preferred bend axis of the main cable 250 thus decreasing the bend strain on the main cable 250.

The clip 132 has a base 134 extending from the first guide portion 130a of the guide member 130 and clip arm 136. The base 134 may be integrally formed into the first guide portion 130a or secured to the first guide portion 130a. The clip arm 136 has one end integrally formed into the base 134 and extends from the base 134 to form an L-shaped structure that forms a gap 138 to hold a cable between the first guide portion 130a and the clip arm 136. A free end of the clip arm 136 has a lip 140 that extends into the gap 138 to reduce the gap 138 opening at the free end of the clip arm 136 so that a cable inserted into the gap can be at least temporarily held in the gap 138.

Figure 10:
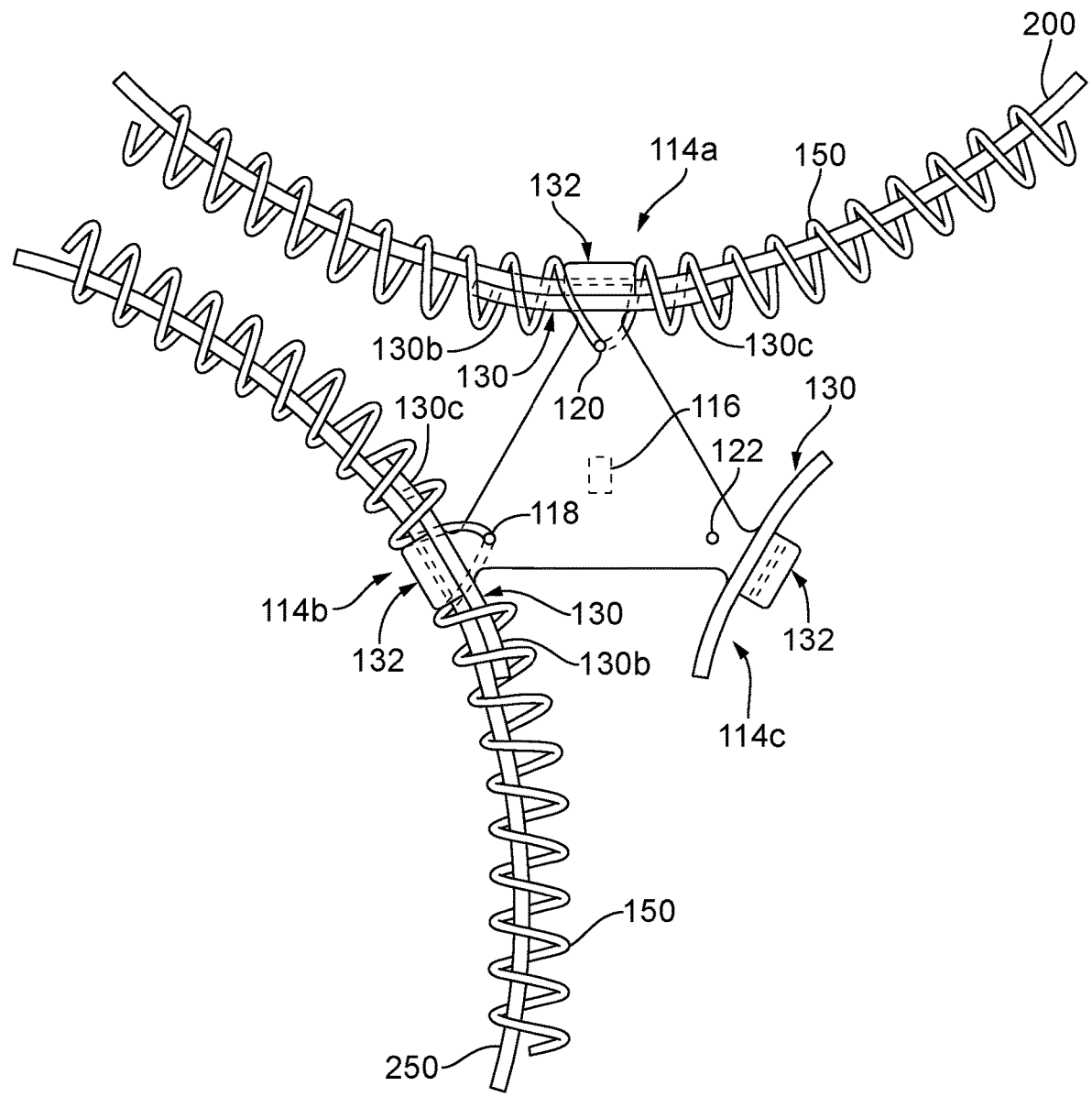
FIG. 10 is a bottom plan view of the multi-sided cable clamp similar to FIG. 8, illustrating a drop cable within a first cable holding assembly and a first retaining wire passing through the central body and wrapped around each end of the first cable holding assembly and the drop cable, and a main cable within a second cable holding assembly and a second retaining wire passing through the central body and wrapped around each end of the second cable holding assembly and the main cable.

Turning now to FIG. 10, the operation of connecting the clamp 100 to a drop cable and a main cable will now be described. Initially, a drop cable 200 is positioned within the clip 132 of a first cable holding assembly 114a so that the flat part of the cable is in a vertical orientation. An end of a retaining wire 150 is then inserted into the aperture 120 in the central body 112 and a length of the retaining wire 150 is pulled through the aperture 120 and wrapped around the second guide portion 130b of the guide member 130 of the cable holding assembly 114a and the cable 200. Similarly, the remaining length of the retaining wire 150 is wrapped around the third guide portion 130c of the guide member 130 of the cable holding assembly 114a and the cable 200. With the drop cable 200 secured to the clamp 100, an extendable reach tool, such as a hot stick, is then attached to the coupling member 116 as is known, and the extendable reach tool is elevated toward and above a main cable 250 extending, for example between two telephone poles, and then lowered until the main cable 250 is positioned within the clip 132 of the cable holding assembly 114b. An end of a retaining wire 150 is then inserted into the aperture 118 in the central body 112 and a length of the retaining wire 150 is pulled through the aperture 118 and wrapped around the second guide portion 130b of the guide member 130 of the cable holding assembly 114b and the cable 250. Similarly, the remaining length of the retaining wire 150 is wrapped around the third guide portion 130c of the guide member 130 of the cable holding assembly 114b and the cable 250. It is noted that an example of a drop cable 200 or 202 and a main cable 250 is an RPX self-supporting cable.

Figure 11:
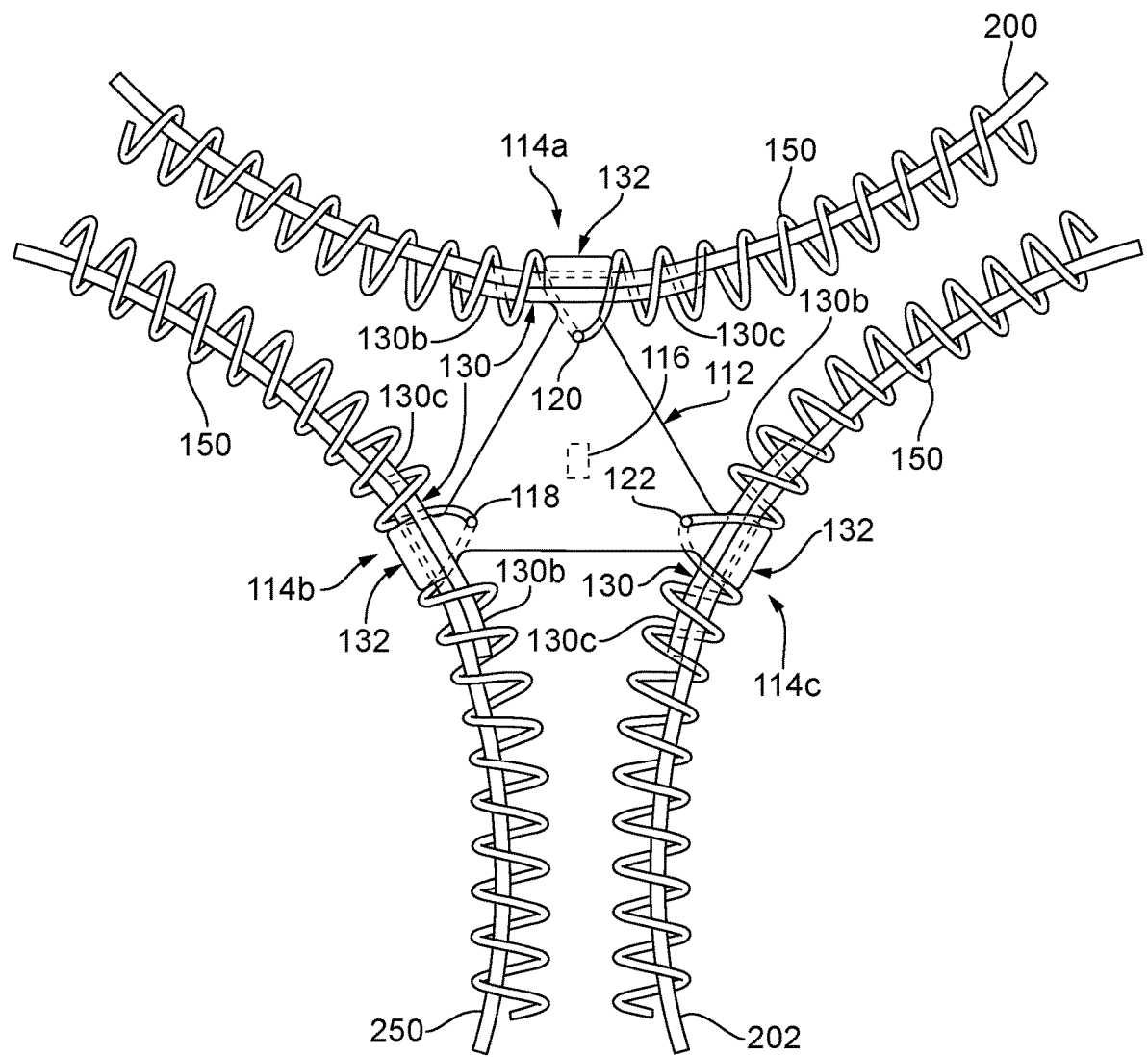
FIG. 11 is a bottom plan view of the multi-sided cable clamp similar to FIG. 8, illustrating a first drop cable within a first cable holding assembly and a first retaining wire passing through the central body and wrapped around each end of the first cable holding assembly and the first drop cable, a second drop cable within a second cable holding assembly and a second retaining wire passing through the central body and wrapped around each end of the second cable holding assembly and the second drop cable, and a main cable within a third cable holding assembly and a third retaining wire passing through the central body and wrapped around each end of the third cable holding assembly and the main cable.

In the embodiment of FIG. 11, the clamp 100 includes a third cable holding assembly 114c that can be used to attach a second drop cable 202 to the clamp 100. In this exemplary embodiment, after the first drop cable 200 is attached to the clamp 100 but before the main cable 250 is attached to the clamp 100, a second drop cable 202 is positioned within the clip 132 of the third cable holding assembly 114c so that the flat part of the cable is in a vertical orientation. An end of a retaining wire 150 is then inserted into the aperture 122 in the central body 112 and a length of the retaining wire 150 is pulled through the aperture 122 and wrapped around the second guide portion 130b of the guide member 130 of the cable holding assembly 114c and the cable 202. Similarly, the remaining length of the retaining wire 150 is wrapped around the third guide portion 130c of the guide member 130 of the cable holding assembly 114c and the cable 202.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A multi-sided cable clamp comprising:
a central body having a plurality of side walls and a coupling member extending from an upper or lower surface of the central body; and
a plurality of cable holding assemblies wherein one of the plurality of cable holding assemblies extends from one of the plurality of side walls, and wherein each cable holding assembly comprises:
   a guide member having a first guide portion attached to one of the plurality of side walls, a second guide portion extending from one end of the first guide portion and a third guide portion extending from one end of the first guide portion; and
   a clip having a base extending from the first guide portion and a clip arm extending from the base and forming a gap between the first guide portion and the clip arm.

2. The multi-sided cable clamp according to claim 1, wherein the coupling member comprises an eye-bracket having an eye for releasably connecting the eye-bracket to an extendable reach tool.

3. The multi-sided cable clamp according to claim 1, wherein the first guide portion of each cable holding assembly is substantially straight.

4. The multi-sided cable clamp according to claim 1, wherein the second guide portion of each cable holding assembly is flared.

5. The multi-sided cable clamp according to claim 1, wherein the third guide portion of each cable holding assembly is flared.

6. The multi-sided cable clamp according to claim 1, wherein the central body further comprises a plurality of apertures, wherein one of the plurality of apertures is in close proximity to one of the cable holding assemblies, and wherein each of the plurality of apertures is configured to receive at least a portion of a retaining wire used to hold a cable in alignment with a cable holding assembly.

7. The multi-sided cable clamp according to claim 1, wherein the central body and the plurality of cable holding assemblies are made of a metallic material, a non-metallic material, of a combination of metallic and non-metallic materials.

8. A multi-sided cable clamp comprising:
   a central body having at least two side walls and a coupling member extending from an upper or lower surface of the central body; and
   a pair of cable holding assemblies wherein a first cable holding assembly extends from a first of the at least two side walls and a second cable holding assembly extends from a second of the at least two side walls, and wherein each cable holding assembly comprises:
      a guide member having a first guide portion attached to one of the at least two side walls, a second guide portion extending from one end of the first guide portion and a third guide portion extending from another end of the first guide portion; and
      a clip having a base extending from the first guide portion and a clip arm extending from the base and forming a gap between the first guide portion and the clip arm.

9. The multi-sided cable clamp according to claim 8, wherein the coupling member comprises an eye-bracket having an eye for releasably connecting the eye-bracket to an extendable reach tool.

10. The multi-sided cable clamp according to claim 8, wherein the first guide portion of each cable holding assembly is substantially straight.

11. The multi-sided cable clamp according to claim 8, wherein the second guide portion of each cable holding assembly is flared.

12. The multi-sided cable clamp according to claim 8, wherein the third guide portion of each cable holding assembly is flared.

13. The multi-sided cable clamp according to claim 8, wherein the central body further comprises a pair of apertures, wherein one of the pair of apertures is in close proximity to one of the cable holding assemblies, and wherein each of the pair of apertures is configured to receive at least a portion of a retaining wire used to hold a cable in alignment with a cable holding assembly.

14. The multi-sided cable clamp according to claim 8, wherein the central body and the pair of cable holding assemblies are made of a metallic material, a non-metallic material, of a combination of metallic and non-metallic materials.

15. A multi-sided cable clamp comprising:
   a central body having a first side wall, a second side wall, a third side wall and a coupling member extending from an upper or lower surface of the central body; and
   three cable holding assemblies wherein a first cable holding assembly extends from the first side wall, a second cable holding assembly extends from the second side wall, a third cable holding assembly extends from the third side wall, and wherein each cable holding assembly comprises:
      a guide member having a first guide portion attached to one of the three side walls, a second guide portion extending from one end of the first guide portion and a third guide portion extending from another end of the first guide portion; and
      a clip having a base extending from the first guide portion and a clip arm extending from the base and forming a gap between the first guide portion and the clip arm.

16. The multi-sided cable clamp according to claim 15, wherein the coupling member comprises an eye-bracket having an eye for releasably connecting the eye-bracket to an extendable reach tool.

17. The multi-sided cable clamp according to claim 15, wherein the first guide portion of each cable holding assembly is substantially straight.

18. The multi-sided cable clamp according to claim 15, wherein the second guide portion of each cable holding assembly is flared.

19. The cable clamp according to claim 15, wherein the third guide portion of each cable holding assembly is flared.

20. The multi-sided cable clamp according to claim 15, wherein the central body further comprises three apertures, wherein a first aperture is in close proximity to the first cable holding assembly, a second aperture is in close proximity to the second cable holding assembly, a third aperture is in close proximity to the third cable holding assembly, and wherein each of the apertures is configured to receive at least a portion of a retaining wire used to hold a cable in alignment with the respective cable holding assembly.

21. The multi-sided cable clamp according to claim 15, wherein the central body and the pair of cable holding assemblies are made of a metallic material, a non-metallic material, of a combination of metallic and non-metallic materials.

* * * * *